(12) United States Patent  (10) Patent No.: US 8,184,132 B2
Sakamoto et al.  (45) Date of Patent: May 22, 2012

(54) ELECTRONIC DISPLAY DEVICE MEDIUM AND SCREEN DISPLAY CONTROL METHOD USED FOR ELECTRONIC DISPLAY MEDIUM

(75) Inventors: Kiyomi Sakamoto, Nara (JP); Masaharu Matsuoka, Osaka (JP); Takanori Morikawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 891 days.

(21) Appl. No.: 11/883,561

(22) PCT Filed: Feb. 27, 2006

(86) PCT No.: PCT/JP2006/303558
§ 371 (c)(1),
(2), (4) Date: Aug. 2, 2007

(87) PCT Pub. No.: WO2006/093074
PCT Pub. Date: Sep. 8, 2006

(65) Prior Publication Data
US 2008/0117323 A1    May 22, 2008

(30) Foreign Application Priority Data
Mar. 1, 2005  (JP) ................................. 2005-056008

(51) Int. Cl.
*H04N 7/16* (2011.01)
*G09G 5/10* (2006.01)
*G09G 5/00* (2006.01)

(52) U.S. Cl. ........................... 345/690; 345/156; 725/10
(58) Field of Classification Search .......... 345/156–158; 715/784; 705/14.41
See application file for complete search history.

(56) References Cited

U.S. PATENT DOCUMENTS

| 6,483,485 | B1 * | 11/2002 | Huang et al. ..................... 345/10 |
| 7,181,693 | B1 * | 2/2007 | Anderson et al. ............. 715/745 |
| 2003/0066071 | A1 * | 4/2003 | Gutta et al. ..................... 725/10 |
| 2005/0052348 | A1 | 3/2005 | Yamazaki et al. |

FOREIGN PATENT DOCUMENTS

| JP | 08-289327 | 11/1996 |
| JP | 11-249064 | 9/1999 |
| JP | 3075971 | 12/2000 |
| JP | 2003-076353 | 3/2003 |
| JP | 2003-196012 | 7/2003 |
| JP | 2003-280622 | 10/2003 |
| JP | 2004-180208 | 6/2004 |
| JP | 2004-357760 | 12/2004 |
| JP | 2005-067367 | 3/2005 |

OTHER PUBLICATIONS

English language machine translation of JP 2004-357760 dated Dec. 2004.

* cited by examiner

*Primary Examiner* — William Boddie
(74) *Attorney, Agent, or Firm* — Wenderoth, Lind & Ponack, L.L.P.

(57) ABSTRACT

When an electronic book is activated, a video image obtaining section starts taking face images of a user. Next, an analysis section analyzes the face images of the user taken by the video image obtaining section, thereby inferring a physiological condition of a user. Then, a display control section adjusts, in units of predetermined time periods, a display state of a screen, such as brightness and contrast, in accordance with the physiological condition.

4 Claims, 15 Drawing Sheets

ELECTRONIC DISPLAY DEVICE MEDIUM AND SCREEN DISPLAY CONTROL METHOD USED FOR ELECTRONIC DISPLAY MEDIUM

TECHNICAL FIELD

The present invention relates to an electronic display medium, and particularly relates to screen display control for the electronic display medium.

BACKGROUND ART

In recent years, electronic display devices which allow a book or the like to be displayed on a portable display device for reading, i.e., so-called electronic books, have been available in the market. Because improvements have been made in hardware functions, e.g., resolution and contrast, of electronic display media, the devices have come down in price, and the devices which do not use paper are considered to be ecological (e.g., patent document 1).

Patent Document 1: Japanese Laid-Open Patent Publication No. 2003-196012

SUMMARY OF THE INVENTION

Problems to be Solved by the Invention

However, an electronic book disclosed in the aforementioned patent document 1 requires a user to adjust contrast and brightness of a screen. If the user keeps looking at the screen for a long period of time without adjusting the brightness and the like, eyestrain is gradually caused and physical fatigue (visual fatigue) accumulates. As a result, for example, the user feels that the screen is dark and characters are not easy to read even though the brightness of the screen has not changed, or the user becomes unable to concentrate on reading due to drowsiness caused by the accumulated fatigue. Further, not only when the user keeps looking at an electronic book but also when the user keeps watching a television or looking at a screen of such an electronic display medium as a personal computer or a mobile phone (i.e., when the user is engaged in a visual information processing task), frequency of nictitation (blinking) is generally reduced so as to prevent loss of visual information (e.g., a content displayed on the screen). For this reason, if the user keeps looking at the screen for a long period of time, eyestrain is gradually caused and physical fatigue (visual fatigue) accumulates. As a result, for example, the user feels that images and characters displayed on the screen are difficult to see, or the user feels sleepy due to the accumulated fatigue.

Therefore, an object of the present invention is to provide an electronic display medium which is capable of inferring a physiological condition of the user and performing display control, e.g., contrast and brightness control, in accordance with the physiological condition.

Solution to the Problems

The present invention has the following features to achieve the object mentioned above.

A first aspect of the present invention is an electronic display medium comprising: a screen for displaying a content; a video image obtaining section for taking a face image of a user; an analysis section for obtaining physiological information about a human from the face image taken by the video image obtaining section and analyzing the physiological information, thereby inferring a physiological condition of the user; and a display control section for controlling, in accordance with the physiological condition inferred by the analysis section, a display state of the screen displaying the content. Referred to here as the electronic display medium is an electronic book, television, personal computer, car navigation apparatus, mobile phone or the like. Further, controlling the display state of the screen means changing brightness and contrast of the screen and changing a character size and image size of the content. In other words, such a control as to change the displayed content, e.g., a page flipping command, is not regarded here as a control of the display state of the screen.

In a second aspect of the present invention based on the first aspect, the electronic display medium further comprises a surrounding light detection section for detecting a brightness of surrounding light. The display control section controls the display state of the screen in accordance with the physiological condition inferred by the analysis section and the brightness of the surrounding light.

In a third aspect of the present invention based on the first aspect, the electronic display medium further comprises means for, based on the physiological condition inferred by the analysis section, shifting a mode of the electronic display medium to a power saving mode or turning off the electronic display medium.

In a fourth aspect of the present invention based on the first aspect, the analysis section includes: an image cutout section for cutting out, from the face image, an image of an area encompassing an eye; an eye information measuring section for measuring, from the image cut out by the image cutout section, eye information about activities or changes in an eyeball and a peripheral body part of the eyeball; and a physiological condition inferring section for analyzing the eye information measured by the eye information measuring section and inferring a physiological condition of a human.

In a fifth aspect of the present invention based on the fourth aspect, the eye information measuring section measures, as the eye information, nictitation information about nictitating.

In a sixth aspect of the present invention based on the fifth aspect, the nictitation information contains at least one of: a number of nictitations; and a period of time having passed until the eye has closed and a period of time having passed before the eye opens.

In a seventh aspect of the present invention based on the fourth aspect, the eye information measuring section measures, as the eye information, pupil information about a pupil.

In an eighth aspect of the present invention based on the seventh aspect, the pupil information contains at least one of a pupil diameter and a rate of change in the pupil diameter.

In a ninth aspect of the present invention based on the first aspect, the display control section switches, in accordance with the physiological condition inferred by the analysis section, an output mode among a first output mode which does not change the display state of the screen, a second output mode for changing, for the screen, at least one of: contrast; brightness; coloring; and a size of a displayed image, and a third output mode for displaying a predetermined message on the screen.

In a tenth aspect of the present invention, the analysis section obtains the physiological information at a predetermined timing, and analyzes the physiological information, thereby inferring the physiological condition of the user.

In an eleventh aspect of the present invention, the predetermined timing is a time point at which a visual information processing task is completed. Here, referred to as the visual information processing task is television viewing, electronic book browsing, driving, continuous monitoring work or the like which is a task requiring visual information processing. Also, a time point at which the visual information processing task is completed is a timing at which a series of visual information processing ends, e.g., when a commercial break starts during a television program, when a page flipping operation is performed on the electronic book, or when a driver stops a vehicle at a red light.

A twelfth aspect of the present invention is a screen display control method used for an electronic display medium, the method comprising: a video image obtaining step of taking a face image of a user; an analyzing step of obtaining physiological information about a human from the face image taken at the video image obtaining step and analyzing the physiological information, thereby inferring a physiological condition of the user; and a display control step of controlling, in accordance with the physiological condition inferred at the analyzing step, a display state of a screen displaying a content.

Effect of the Invention

According to the above first aspect, the physiological condition of the user is inferred from the face image of the user, and the display of the screen is controlled in accordance with the inferred physiological condition. This allows readability and visibility of the electronic display medium to be improved in response to the physiological condition of the user.

According to the above second aspect, the display of the screen is controlled by taking into account a change in the surrounding light of the electronic display medium. As a result, the display of the screen is controlled appropriately.

According to the above third aspect, power saving of the electronic display medium is performed in accordance with the physiological condition of the user.

According to the above fourth to eighth aspects, a degree of interest, fatigue and drowsiness of the user are precisely inferred since the physiological condition of the user is inferred by analyzing the eye information about activities or changes in an eyeball and a peripheral body part of the eyeball. This enables the display to be appropriately controlled in accordance with the physiological condition of the user.

The above ninth aspect provides the same effect as those of the first aspect.

According to the above tenth aspect, processing loads on the electronic display medium are reduced by limiting a timing of performing an analysis process.

According to the above eleventh aspect, the analysis process is performed after the visual information processing task is completed. This allows processing loads to be reduced, and enables the analysis of the physiological condition to be efficiently performed.

Further, the screen display control method used for the electronic display medium of the present invention provides the same effects as those of the first aspect.

Figure 1:
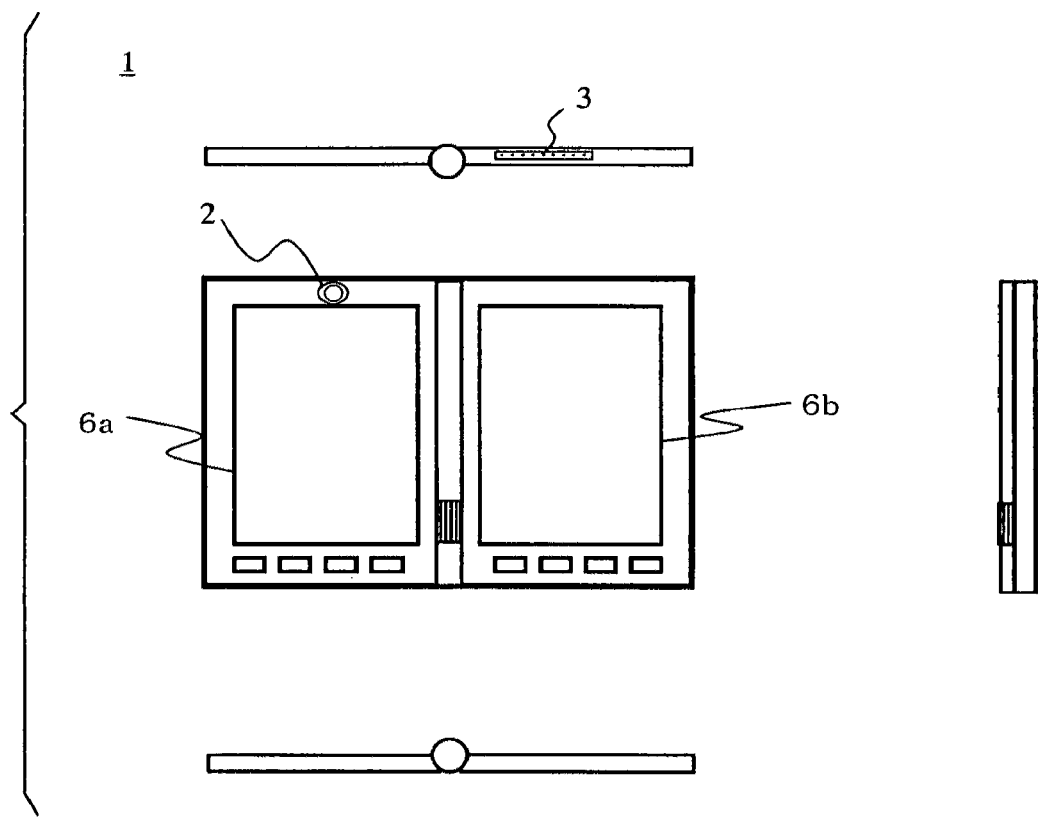
FIG. 1 is an external view of an electronic book 1 according to a first embodiment of the present invention.

DESCRIPTION OF THE REFERENCE CHARACTERS 1 electronic book
2 video image obtaining section
3 content obtaining section
4 analysis section
5 display control section
6 screen
7 brightness detection section
10 electronic book
40 analysis section
41 image cutout section
42 nictitation measuring section
43 physiological condition inferring section
45 pupil measuring section
100 television
101 car navigation apparatus
102 personal computer
103 mobile phone

DETAILED DESCRIPTION OF THE INVENTION

Hereinafter, embodiments of the present invention will be described with reference to the drawings. Note that, the present invention is not limited to these embodiments.

First Embodiment

Figure 2:
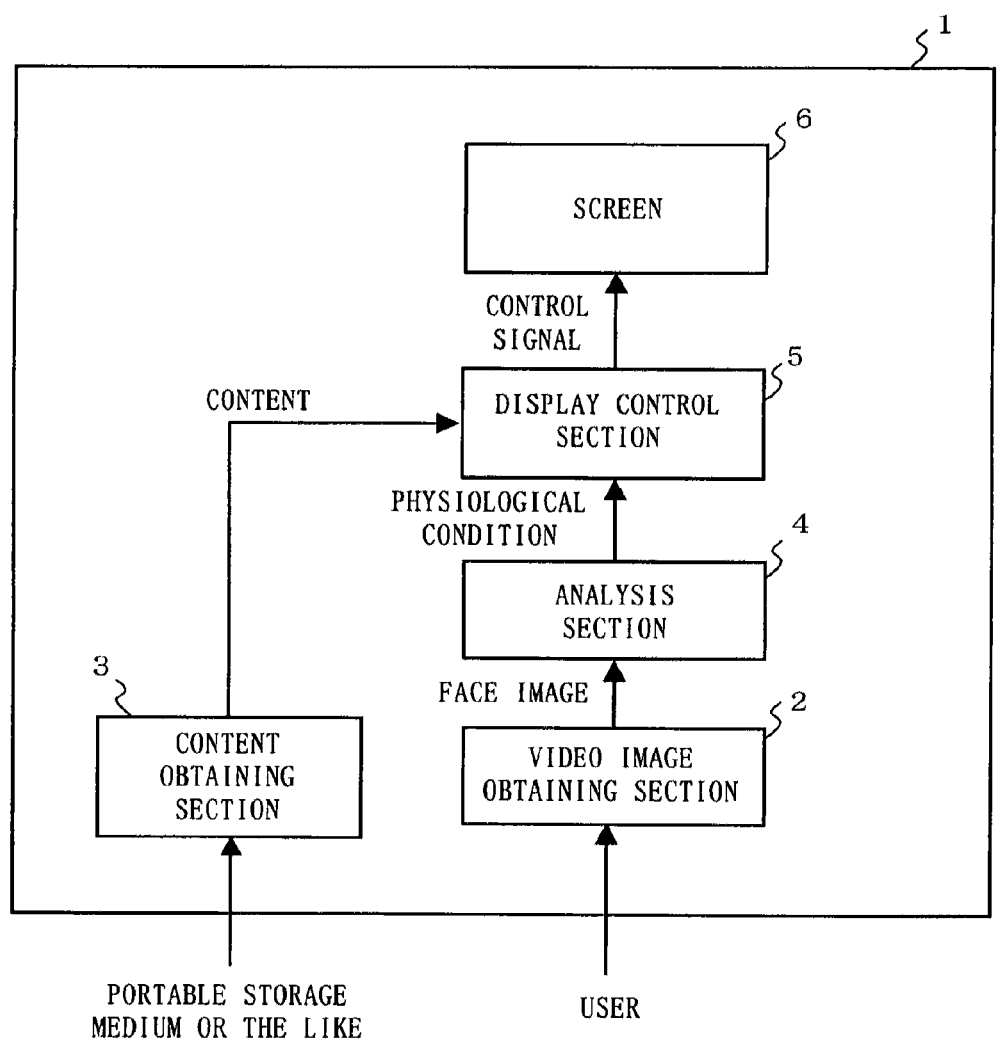
FIG. 2 is a function block diagram showing the electronic book 1 according to the first embodiment of the present invention.

FIG. 1 is an external view of an electronic book which is an example of an electronic display medium according to a first embodiment of the present invention. FIG. 2 is a block diagram showing a functional configuration of the electronic book according to the first embodiment of the present invention. As shown in FIG. 2, the electronic book 1 comprises an video image obtaining section 2, content obtaining section 3, analysis section 4, display control section 5 and a screen 6.

The video image obtaining section 2 is typically a camera which takes images of a user of the electronic book 1 and which outputs the images to the analysis section 4 as video image data. Preferably, the video image obtaining section 2 may have a light-emitting unit which illuminates the user's face when, e.g., lighting is not sufficiently bright. Here, it is conceivable to use far-red light for a light source of the light-emitting unit so that the user may not feel that an emitted light is too bright.

The content obtaining section 3 reads content from a portable storage medium such as a CD-ROM and memory card, and then outputs the content to the display control section 5. Here, a communication section capable of communicating with the outside (not shown) may be provided so as to obtain content from the outside via an antenna or the like.

The analysis section 4 analyzes the images of the user taken by the video image obtaining section 2, thereby inferring a physiological condition of the user. The analysis section 4 outputs the inferred physiological condition to the display control section 5 as an analysis result.

The display control section 5 displays the obtained content on the screen 6. The display control section 5 receives from the user an instruction inputted via an operation section which is not shown, and in response thereto, performs an operation for the content such as page flipping. Also, the display control section 5 performs, based on the analysis result provided from the analysis section 4, a screen display control such as brightness and contrast adjustment of the screen 6.

The screen 6 is, for example, a reflective liquid crystal display. Although the electronic book is used here as an example of an electronic display medium, if the electronic display medium is a television or personal computer, the screen 6 may also be a CRT (Cathode Ray Tube) display, LCD (Liquid Crystal Display), PDP (Plasma Display Panel) or the like.

Figure 3:
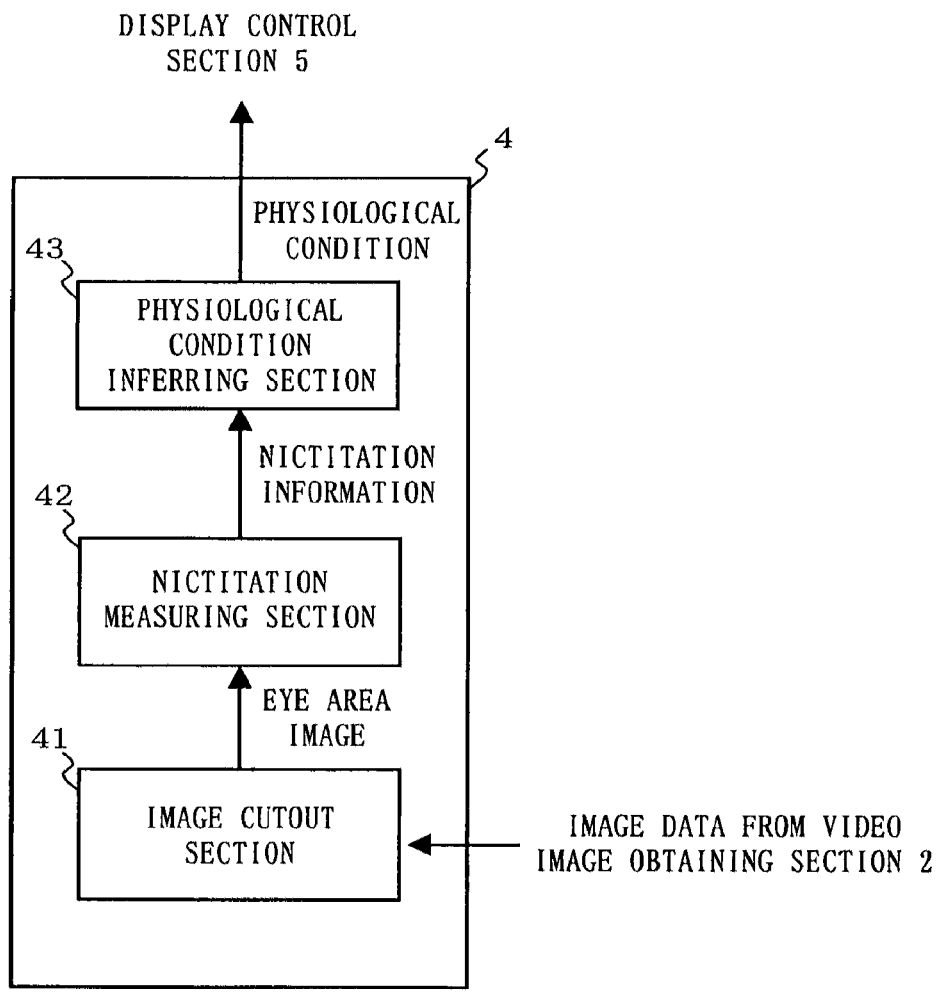
FIG. 3 is a block diagram showing a function configuration of an analysis section 4 of FIG. 1.

FIG. 3 is a block diagram showing a functional configuration of the analysis section 4. The analysis section 4 includes an image cutout section 41, nictitation measuring section 42 and physiological condition inferring section 43. The image cutout section 41 extracts, from the video image data outputted from the video image obtaining section 2, image data of a small area encompassing an eye of the user. The nictitation measuring section 42 measures, based on the image data of the area encompassing the eye which the image cutout section 41 has cut out, an interval between upper and lower eyelids of the eye, which interval indicates a degree of opening of the eye (hereinafter, referred to as an eye opening degree). The nictitation measuring section 42 measures the eye opening degree for each frame of the image data, and generates a waveform indicating a change occurring over time in the eye opening degree (hereinafter, referred to as a nictitation waveform; see FIG. 5). The physiological condition inferring section 43 infers, based on the nictitation waveform, the physiological condition of the user, and outputs the physiological condition to the display control section 5 as an analysis result.

In the present embodiment, when the electronic book 1 is activated, a camera (video image obtaining section 2) starts taking face images of the user. When the electronic book 1 is in operation, the electronic book 1 analyzes, minute by minute, video images of the user which have been taken for the past one minute, and infers the physiological condition of the user by using nictitation information. Based on the physiological condition, the electronic book changes a display state of the screen. In other words, the electronic book 1 changes, minute by minute, the display state of the screen in accordance with the physiological condition of the user. Here, changing the display state of the screen (screen display control) means changing the brightness and contrast of the screen, as well as a character size and image size of a content. In other words, such a control as to change the displayed content, e.g., a page flipping command, is not regarded here as changing the display state of the screen.

Described below is a reason for the nictitation information to be used for inferring the physiological condition. For example, when a person is watching a television, his/her nictitation frequency greatly decreases. Further, the more interesting a television program, i.e., the more the person is interested in a television program, the less frequent his/her nictitation. Thus, when a person is watching something in which the person is highly interested, his/her nictitation frequency reduces. Further, when the person continues to be nervous or perform a particular task for a long period of time, the person feels sleepy or finds it hard to keep opening his/her eyes. In such a case, i.e., when the person is tired, a period of time taken to close the eyes, or a period of time taken before opening the eyes, becomes significantly long. Further, when the person feels sleepy, a few continuous nictitations occur during one or two seconds (referred to as a cluster nictitation). Whether the user is, e.g., concentrating on a content, or tired from reading the content, or feels sleepy can be inferred by measuring the above-described characteristics of nictitation.

Figure 4:
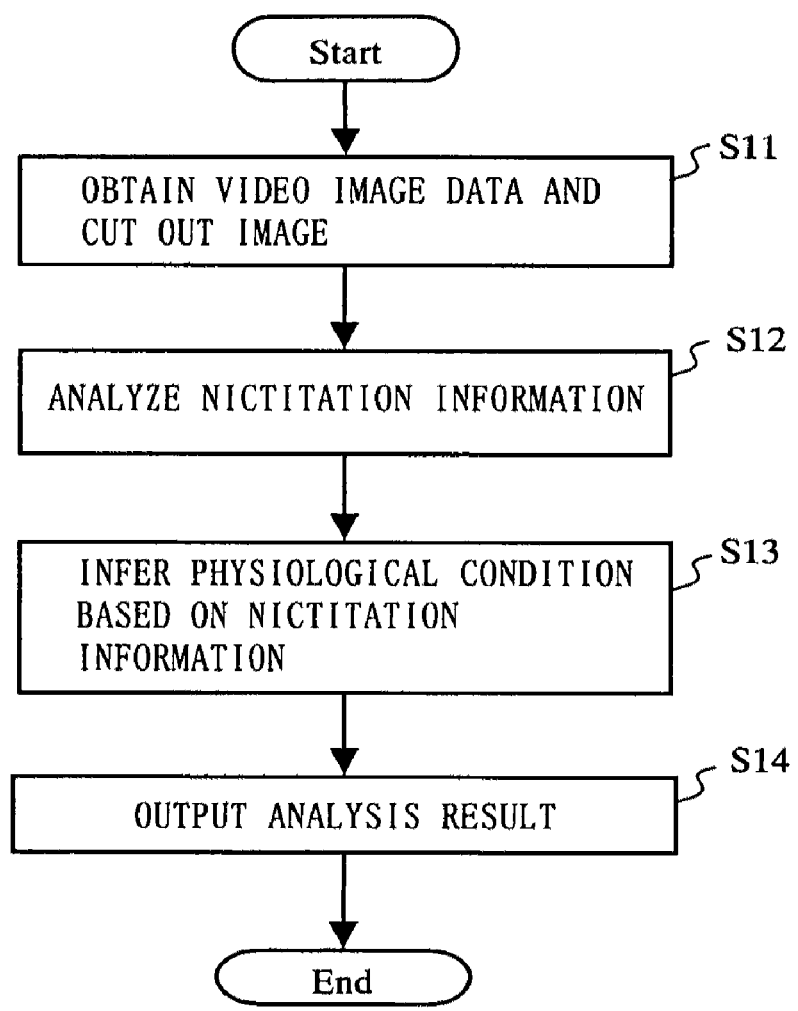
FIG. 4 is a flowchart showing an analysis process according the first embodiment of the present invention.
Figure 5:
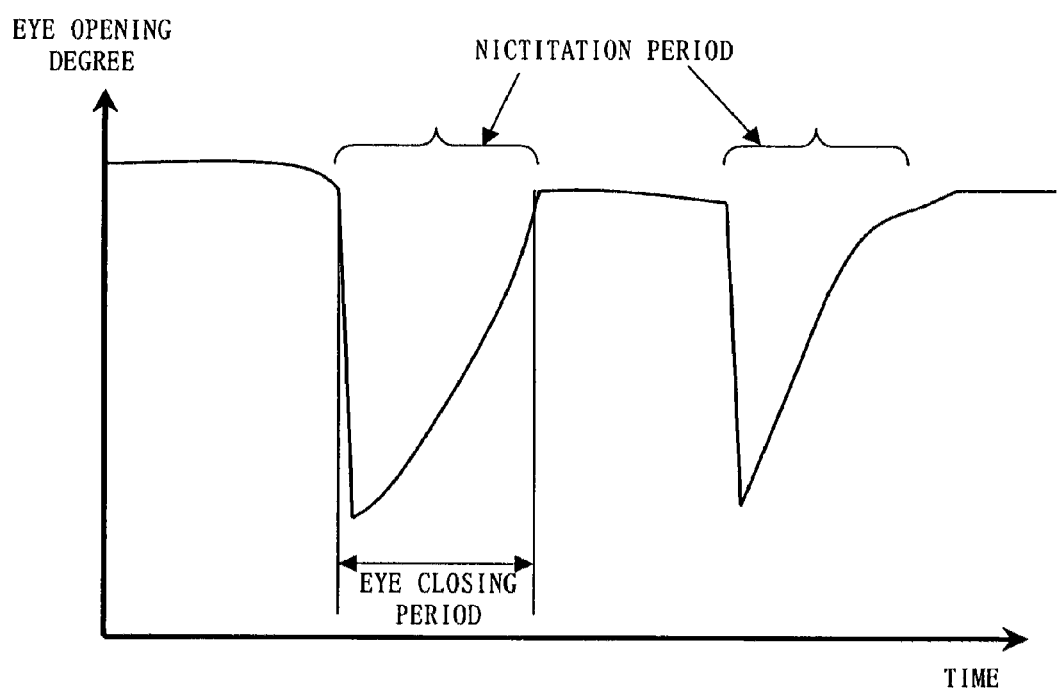
FIG. 5 shows an exemplary nictitation waveform.
Figure 6:
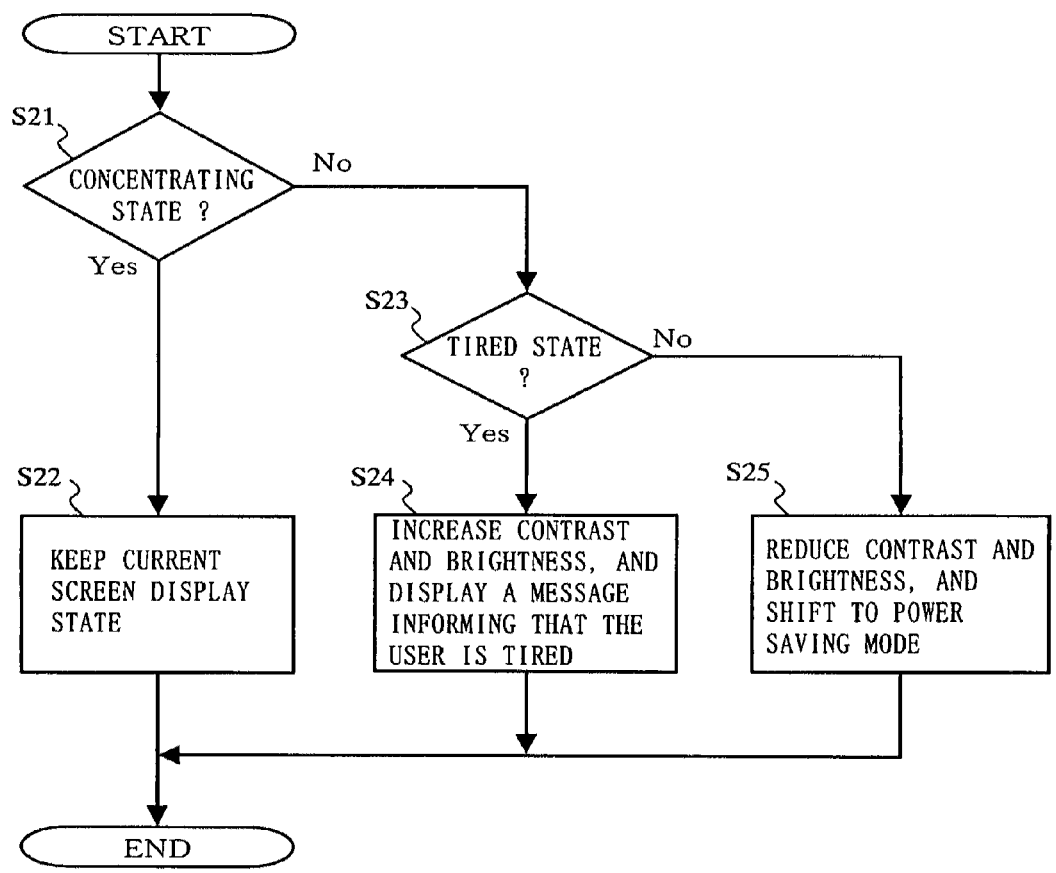
FIG. 6 is a flowchart showing a display control process according to the first embodiment of the present invention.

Hereinafter, operations performed by the electronic book in a display control process will be described in detail with reference to FIGS. 4 to 6. First, when the user turns on a power switch which is not shown, the electronic book 1 is activated. When, after the electronic book 1 is activated, the user has inserted a CD-ROM containing content into the content obtaining section 3, the content obtaining section 3 reads the content from the CD-ROM, and sends data thereof to the display control section 5. The display control section 5 displays the content on the screen 6 according to an initial screen setting (brightness, contrast and the like). At the same time, the video image obtaining section 2 starts taking face images of the user. Image data of the taken images is stored in a buffer which is not shown. For example, in an image taken by using the above-mentioned far-red light, only a pupil is dark, and an iris has a brightness slightly darker than that of the white of an eyeball since the far-red light is highly reflective on the iris. To be specific, in the image taken by using the far-red light, the pupil is the darkest, and brightness becomes higher in the following order: the iris, the white of the eye, and skin such as the eyelid. The pupil, eyelid and the like can be each identified from this difference in brightness.

One minute after the video image obtaining section 2 has started taking images, the analysis section 4 starts an analysis process described below. FIG. 4 is a flowchart showing in detail the analysis process which the analysis section 4 performs. First, the image cutout section 41 obtains, from the aforementioned buffer, video image data which the video image obtaining section 2 has obtained for the past one minute. The image cutout section 41 then cuts out, from each frame of the video image data, an image of an area encompassing an eye (hereinafter, referred to as an eye area image) (step S11).

Next, the nictitation measuring section 42 measures an eye opening degree (an interval between upper and lower eyelids which indicates a degree of opening of the eye) from the eye area image by using the aforementioned difference in brightness, and then generates the above-described nictitation waveform. FIG. 5 is an exemplary nictitation waveform. When the user nictitates, the eye opening degree becomes small for a brief period of time. Accordingly, as shown in FIG. 5, a period of time during which the user nictitates is detected as a descending pulse-like portion. The nictitation measuring section 42 measures, from the nictitation waveform, the number of nictitations, an interval between nictitations, dynamic characteristics of nictitation (a period of time in a single nictitation from when the eyelid starts closing to when the eyelid has completely closed, and a period of time in a single nictitation from when the closed eyelid starts opening to when the eyelid has completely opened) and the like as nictitation information (step S12). Then, based on the nictitation information, the physiological condition inferring section 43 infers the physiological condition of the user (step S13). Described below is exemplary inferring of the physiological condition at step S13.

For example, when it is assumed that an average number of nictitations is normally 20 times per minute, an inference can be made as follows:

(1) a measured number of nictitations≦20
→it is considered that the user is concentrating on a content, i.e., the physiological condition is in a "concentrating state";

(2) (the number of nictitations>20) & (the cluster nictitation occurs a few times within one or two seconds)
→it is considered that an arousal level (degree of arousal) is low, i.e., the physiological condition is in a "drowsy state";

(3) a dynamic characteristic of nictitation (e.g., a period of time from when a closed eyelid starts opening to when the eyelid has completely opened) has a greater value than a predetermined value
→it is considered that the user is tired, i.e., the physiological condition is in a "tired state".

Then, the physiological condition inferring section 43 outputs, to the display control section 5, the physiological condition inferred in the above manner (step S14).

Next, the display control section 5 performs a display control of the screen in accordance with the outputted physiological condition. FIG. 6 is a flowchart showing in detail the display control process which the display control section 5 performs. As shown in FIG. 6, the display control section 5 first determines whether or not the physiological condition is in the concentrating state (step S21). When a result of the determination indicates that the physiological condition is in the concentrating state (YES at step S21), the display control section 5 does not change a display state of the screen 6 (step S22) and terminates the display control process.

On the other hand, when a determination result at step S21 indicates that the physiological condition is not in the concentrating state (No at step S21), the display control section 5 determines whether or not the physiological condition is in the tired state (step S23). When a result of the determination indicates that the physiological condition is in the tired state (YES at step S23), the brightness and contrast of the screen 6 are increased in order to increase the arousal level of the user, and at the same time, a message informing that the user is tired is displayed on the screen 6. Further, a message informing that the brightness and contrast have been adjusted is displayed on the screen 6 for a predetermined period of time. For example, messages such as "You are in the tired state" and "Brightness has been changed from 70% to 85%" are displayed on an upper left edge of the screen (step S24). On the other hand, when the user is not in the tired state (NO at step S23), it is inferred that the user is in the drowsy state. For this reason, the display control section 5 reduces the brightness and contrast of the screen 6, and at the same time, displays, on the screen 6 for a predetermined period of time, a message informing that the brightness and contrast have been adjusted. For example, a message, e.g., "Brightness has been changed from 70% to 50%", is displayed on the upper left edge of the screen (step S25). This enables power saving for the screen display to be performed when the user is not concentrating on looking at the screen due to dozing. This also allows the user to be informed that the display state of the screen has been changed.

The electronic book 1 performs the above-described analysis process and display control process minute by minute. In other words, when the electronic book 1 is in operation, the electronic book 1 infers the physiological condition of the user minute by minute, and based on a result of the inference, performs the display control of the screen 6. Then, the display control process according to the first embodiment ends.

Thus, in the first embodiment, the physiological condition of the user is inferred, and the display control of the screen is performed based on the physiological condition. This allows, when the user is tired, a control for, e.g., increasing the brightness of the screen in order to provide an easily viewable display to be performed. Since the nictitation information is used, a level of interest, fatigue, drowsiness and the like of the user are precisely inferred, and this allows an appropriate display control to be performed in accordance with the physiological condition of the user.

Note that, in addition to adjusting brightness and contrast as described above, changing coloring of the screen display may be used as a manner of controlling the display. Further, a content displayed on the screen may be enlarged.

For the display control, the electronic book 1 may have a first display mode in which the display state of the screen is not changed from a current display state, a second display mode for changing at least one of the following features of the screen: contrast; brightness; coloring; and a size of an image to be displayed, and a third display mode for displaying such a message as described above, e.g., a message informing that the user is tired. The display control section 5 may switch a display mode among the above-described three display modes in accordance with the aforementioned physiological condition.

Second Embodiment

Next, a second embodiment of the present invention will be described with reference to FIGS. 7 to 11. In the above first embodiment, the physiological condition is inferred using the nictitation information. In the second embodiment the physiological condition is inferred using pupil information instead of the nictitation information.

Described here is a relationship between a pupil and a physiological condition. First, a description will be given for a pupil size (pupil diameter). The pupil constricts when light hits the eye (referred to as a light reaction), and dilates in the dark. The pupil diameter of a young person changes from a smallest diameter of 2 mm to a largest diameter of 8 mm, whereas the pupil diameter of an aged person does not dilate in the dark as the pupil diameter of a young person does. A maximum pupil diameter of an aged person is approximately 6 mm. Further, a characteristic of reaction speed in the light reaction is different between a young person and an aged person. The reaction speed of an aged person is slower than that of a young person. Described next is a change in pupil diameter. Even if the amount of light incident on the eye is fixed, a pupil size oscillates with a low frequency. When a person is nervous, the pupil is wide open (mydriasis), and hippus is not noticeable. However, when the person begins to feel fatigue or drowsiness, the pupil constricts (miosis) and hippus occurs. The more tired or drowsy the person, the greater is the hippus. The pupil dilates when viewing something interesting, whereas the pupil does not change the size thereof when viewing something uninteresting such as a boring picture or an incomprehensible abstract painting. Thus, a change in the pupil represents a psychological state of the person. For the above reasons, an age of the user, a degree of interest of the user in a viewing object, fatigue of the user and the like can be inferred by measuring a pupil diameter, pupil reaction and the like.

Figure 7:
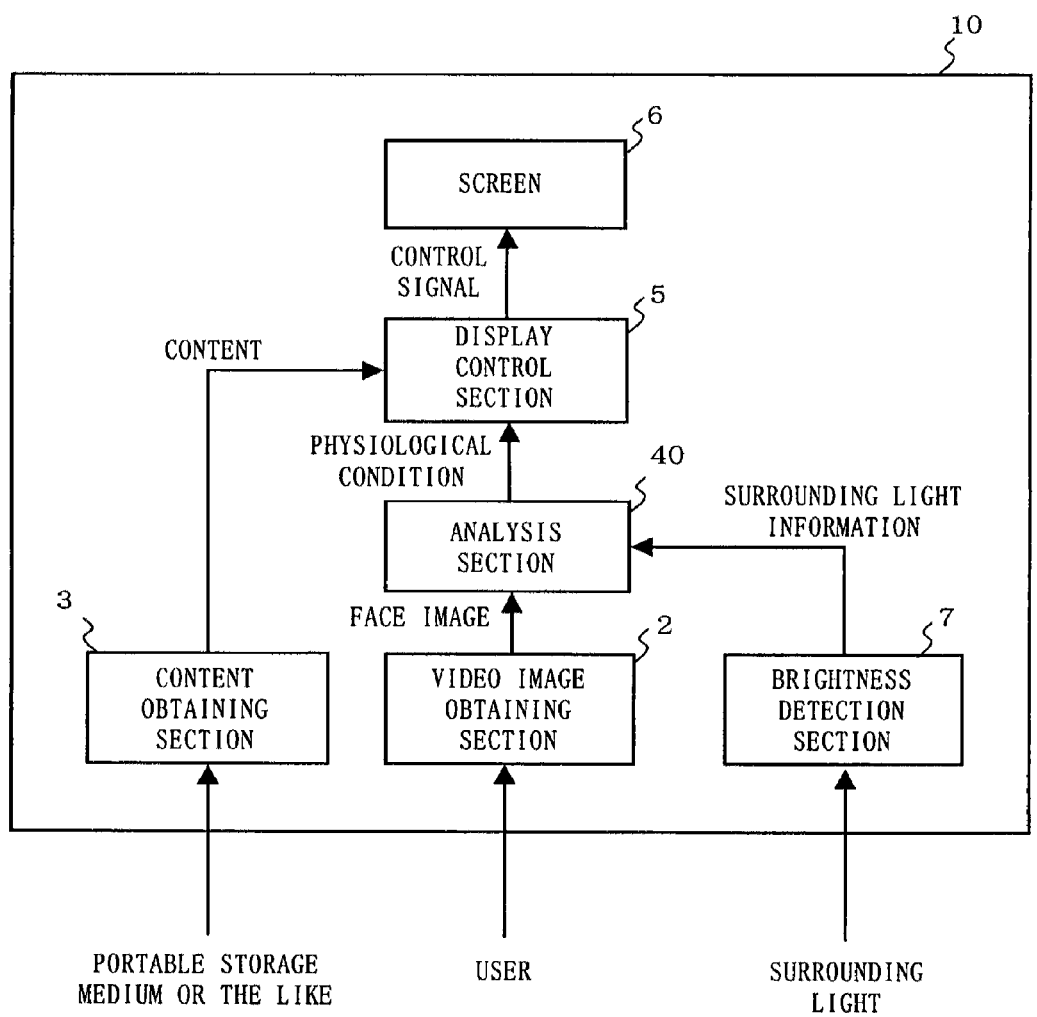
FIG. 7 is a function block diagram showing the electronic book 10 according to a second embodiment of the present invention.

FIG. 7 is a block diagram showing a function configuration of an electronic book 10 according to the second embodiment of the present invention. The electronic book 10 according to the present embodiment is a result of adding a brightness detecting section 7 to the electronic book 1 described above with reference to FIG. 2 in the first embodiment. Since an analysis section of the present embodiment is different from that of the first embodiment, the analysis section of the present embodiment is referred to as an analysis section 40 for clarity. Since the other component sections of the second embodiment are the same as those of the first embodiment, the other component sections are denoted by the same reference numerals as those used in the first embodiment, and detailed descriptions thereof will be omitted. In FIG. 7, the brightness detecting section 7 is realized by an optical sensor or the like which detects brightness of a surrounding area of the electronic book 10. Information about, e.g., a change in brightness of the surrounding area (hereinafter, referred to as surrounding light information) is outputted to the analysis section 40.

Figure 8:
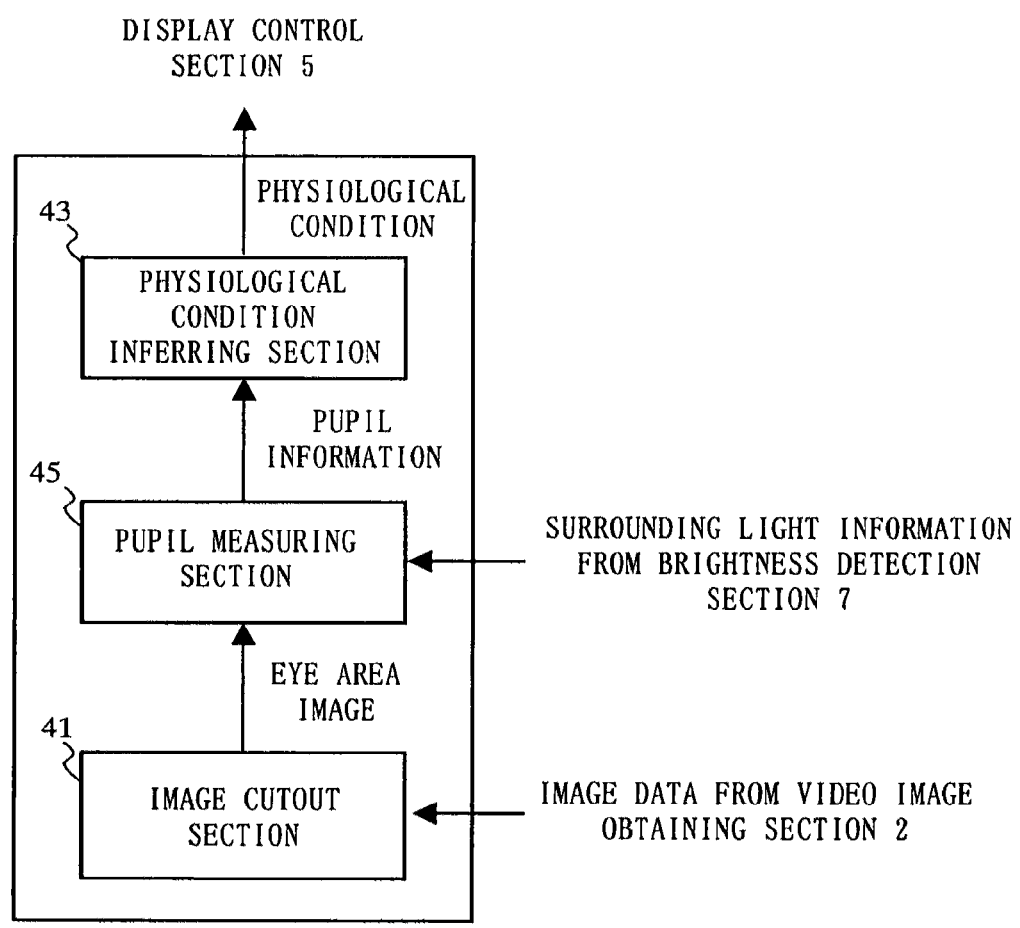
FIG. 8 is a block diagram showing a function configuration of an analysis section 40 of FIG. 6.

FIG. 8 is a block diagram showing a configuration of the analysis section 40 according to the second embodiment of the present invention. In FIG. 8, the analysis section 40 is a result of replacing the nictitation measuring section 42 in the functional configuration of the analysis section 4, which has been described with reference to FIG. 3 in the first embodiment, with a pupil measuring section 45. The other component sections of the analysis section 40 are the same as those of the analysis section 4. For this reason, the component sections of the analysis section 40 which are the same as those of the analysis section 4 are denoted by the same reference numerals as those used for the analysis section 4, and detailed descriptions thereof will be omitted. In FIG. 8, the pupil measuring section 45 measures a pupil diameter and the like from image data of an area encompassing an eye, which image data has been cut out by the image cutout section 41, and outputs the pupil diameter and the like to the physiological condition inferring section 43 as pupil information.

Hereinafter, operations performed in a display control process according to the second embodiment of the present invention will be described in detail. First, when a user turns on a power switch which is not shown, the electronic book 10 is activated. After the electronic book 10 is activated, the user inserts a CD-ROM containing content into the content obtaining section 3. The content obtaining section 3 reads the content from the CD-ROM, and sends data thereof to the display control section 5. The display control section 5 displays the content (e.g., a front page) on the screen 6 according to an initial screen setting (brightness, contrast and the like). At the same time, the video image obtaining section 2 starts taking face images of the user. Image data of the taken images is stored in a buffer which is not shown.

Figure 9:
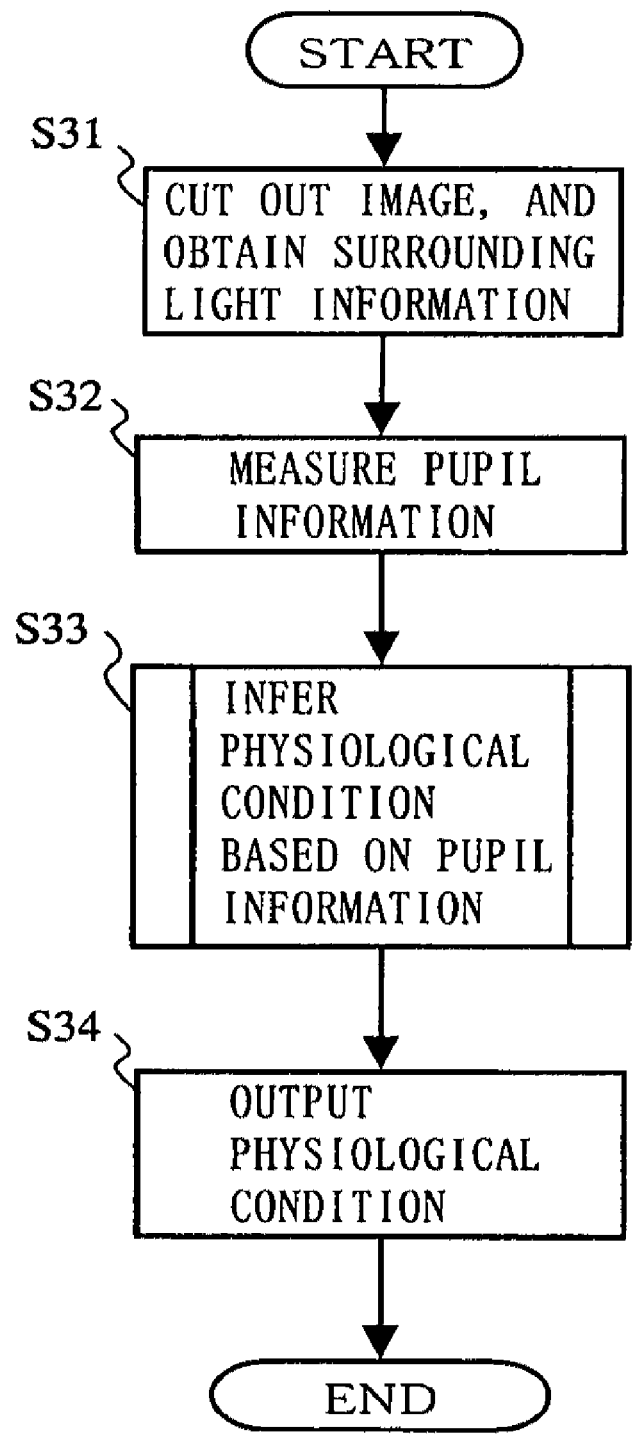
FIG. 9 is a flowchart showing an analysis process according to the second embodiment of the present invention.

One minute after the video image obtaining section 2 has started taking images, the analysis section 40 starts an analysis process described below. FIG. 9 is a flowchart showing the analysis process performed by the analysis section 40. The image cutout section 41 first obtains, from the aforementioned buffer, video image data which the video image obtaining section 2 has obtained for the past one minute. Then, the image cutout section 41 cuts out the aforementioned eye area image from each frame of the video image data. At the same time, the brightness detecting section 7 outputs, to the pupil measuring section 45, the surrounding light information obtained for the past one minute (step S31).

Next, the pupil measuring section 45 measures, as pupil information, a pupil diameter, a reaction speed characteristic of the pupil, and the like (step S32). A conceivable manner of measuring the pupil diameter is, for example, increasing contrast of the eye area image and then measuring square meters or the like of a black portion (black of the eye) and a white portion (white of the eye). Also, it is conceivable to measure, as the reaction speed characteristic, a rate of change in the pupil diameter, which is obtained when the brightness detecting section 7 detects a change in light intensity in the surrounding area, e.g., when a train which the user is aboard emerges from a tunnel. Then, the pupil measuring section 45 outputs the measured pupil information to the physiological condition inferring section 43.

Figure 10:
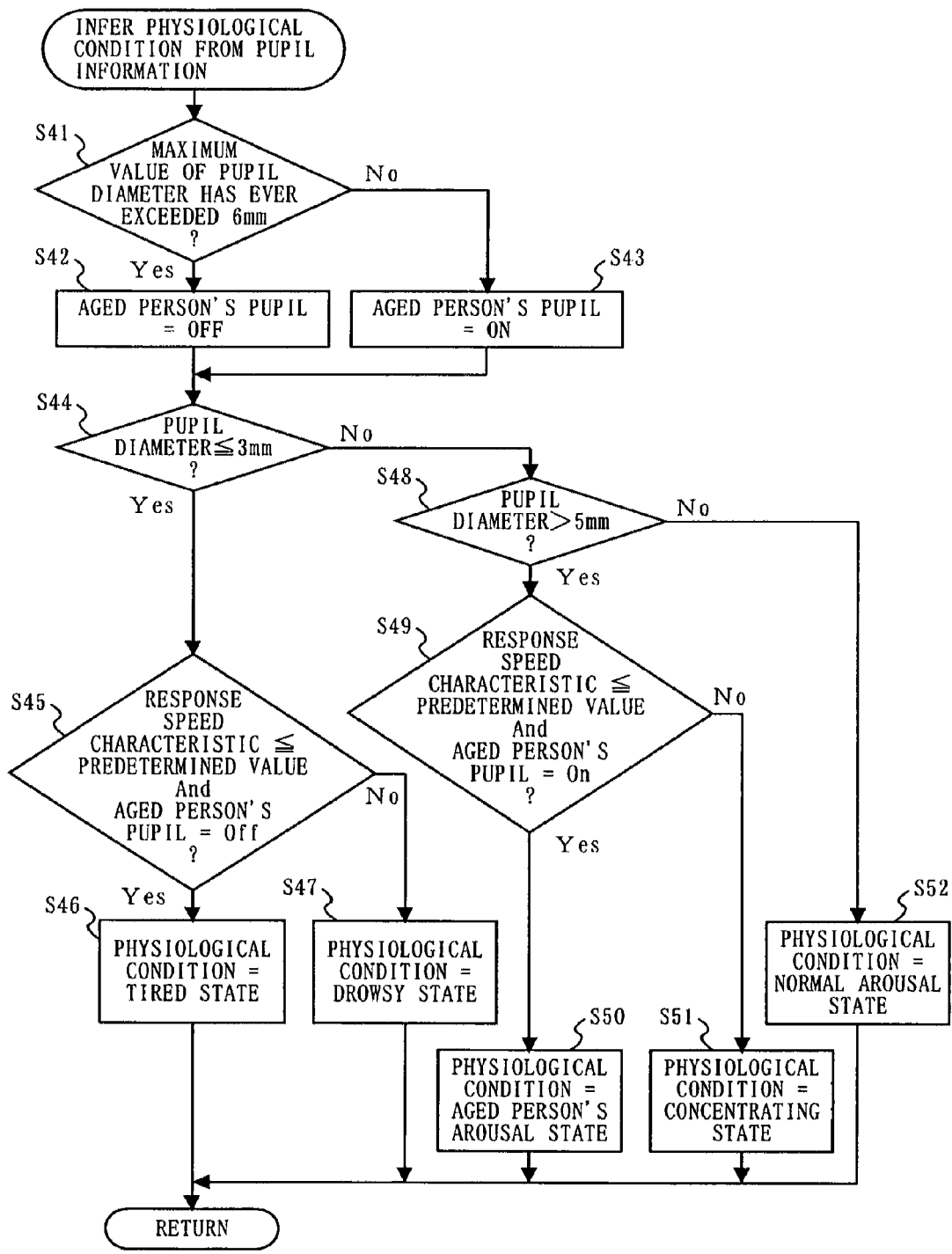
FIG. 10 is a flowchart showing in detail a physiological condition inferring process at step S33 of FIG. 9.

Next, the physiological condition inferring section 43 infers the physiological condition of the user based on the pupil information (step S33). FIG. 10 is a flowchart showing in detail a physiological condition inferring process at the above step S33. As shown in FIG. 10, the physiological condition inferring section 43 first determines whether or not the pupil diameter has ever exceeded 6 mm during a time period from when the electronic book is activated to when the above process is performed (step S41). If the pupil diameter has ever exceeded 6 mm (YES at step S41), the user is considered not to be an aged person. Accordingly, an aged person's pupil flag, which indicates whether or not the user is an aged person, is set to OFF (step S42). On the other hand, if the pupil diameter has never exceeded 6 mm (NO at step S41), the aged person's pupil flag is set to ON (step S43).

Next, the physiological condition inferring section 43 determines, based on a most recently obtained image from among eye area images cut out at step S41, whether or not the pupil diameter is 3 mm or smaller (step S44). When the pupil diameter is 3 mm or smaller (YES at step S44), the physiological condition inferring section 43 proceeds to a next process at step S45. At step S45, the physiological condition inferring section 43 determines whether or not the reaction speed characteristic has a predetermined value or smaller and the aged person's pupil flag is OFF (step S45). If a result of the determination indicates that these conditions are satisfied (YES at step S45), the physiological condition inferring section 43 infers that the physiological condition of the user is in the tired state (step S46). On the other hand, if these conditions are not satisfied (NO at step S45), the physiological condition inferring section 43 infers that the physiological condition of the user is in the drowsy state (step S47).

When a determination result at step S44 indicates that the pupil diameter exceeds 3 mm (NO at step S44), the physiological condition inferring section 43 determines whether or not the pupil diameter in the most recently obtained image is greater than 5 mm (step S48). When a result of the determination indicates that the pupil diameter is greater than 5 mm (YES at step S48), the physiological condition inferring section 43 determines whether or not the reaction speed characteristic has the predetermined value or smaller and the aged person's pupil flag is ON (step S49). When these conditions are satisfied (YES), the physiological condition inferring section 43 infers that the physiological condition is in an aged person's arousal state (step S50). On the other hand, when these conditions are not satisfied (NO), the physiological condition inferring section 43 infers that the physiological condition is in the concentrating state (step S51). When a determination result at step S48 indicates that the pupil diameter is 5 mm or smaller (NO at step S48), the physiological condition inferring section 43 infers that the physiological condition is in a normal arousal state (step S52). Then, the physiological condition inferring process ends.

Return to FIG. 9. The physiological condition inferring section 43 outputs to the display control section 5 the physiological condition inferred at step S42 (step S34). Then, the analysis process performed by the analysis section 40 ends.

Figure 11:
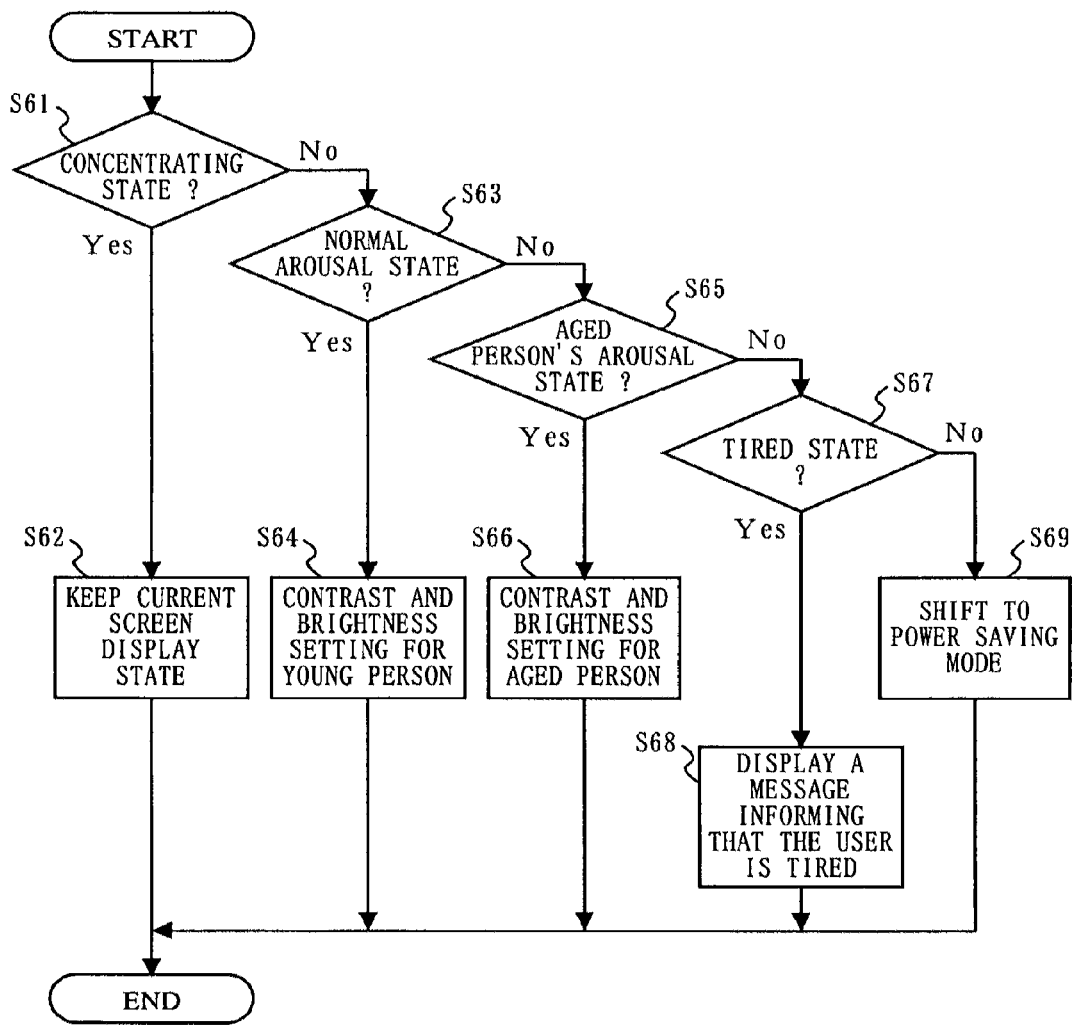
FIG. 11 is a flowchart showing a display control process according to the second embodiment of the present invention.

Next, the display control section 5 performs the display control process for the screen 6 in accordance with the outputted physiological condition. FIG. 11 is a flowchart showing in detail the display control process performed by the display control section 5. As shown in FIG. 11, the display control section 5 determines whether or not the physiological condition is in the concentrating state (step S61). When a result of the determination indicates that the physiological condition is in the concentrating state (YES at step S61), the display control section 5 keeps a current display state of the screen 6 (step S62), and ends the display control process.

On the other hand, when a determination result at step S61 indicates that the physiological condition is not in the concentrating state (NO at step S61), the display control section 5 determines whether or not the physiological condition is in the normal arousal state (step S63). When a result of the determination indicates that the physiological condition is in the normal arousal state (YES at step S63), screen display setting is performed based on predetermined brightness and contrast for a young person (step S64).

On the other hand, when a determination result at step S63 indicates that the physiological condition is not in the normal arousal state (NO at step S63), the display control section 5 determines whether or not the physiological condition is in the aged person's arousal state (step S65). When a result of the determination indicates that the physiological condition is in the aged person's arousal state (YES at step S65), brightness and contrast are set to predetermined brightness and contrast for an aged person (step S64). Here, since an aged person is less sensitive than a young person (e.g., less sensitive to bluish colors due to aging effects in color recognition function), relatively higher values are used for the setting for an aged person than the setting for a young person.

When a determination result at step S65 indicates that the physiological condition is not in the aged person's arousal state (NO at step S65), the display control section 5 determines whether or not the physiological condition is in the tired state (step S67). When a result of the determination indicates that the physiological condition is in the tired state (YES step S67), the brightness and contrast of the screen 6 are increased so as to cause the user to arouse, and also, a message informing that the user is tired is displayed on the screen 6 (step S68). On the other hand, when the physiological condition is not in the tired state (NO at step S67), it is determined that the physiological condition is in the drowsy state. Accordingly, the display control section 5 reduces the brightness and contrast of the screen 6 for power saving (step S69). At this point, similarly to steps S24 and S25 in the above first embodiment, a message informing that the brightness and contrast have been changed is displayed on the screen 6. Then, the display control process performed by the display control section 5 ends.

As described in the above second embodiment, the physiological condition of the user is inferred using the pupil information, whereby the display control congruous to the physiological condition of the user is enabled. Since the pupil information is used, a degree of interest of the user, fatigue of the user's eye, drowsiness of the user, the user's age and the like are precisely inferred, whereby the display control appropriately corresponding to the physiological condition of the user is enabled.

Note that, a determination as to whether the user is an aged person or young person may be made based on the aforementioned reaction speed characteristic. Alternatively, the user may be required to input his/her age beforehand, and the aged person's pupil flag may be set to be ON/OFF accordingly.

Further, in the above description, the brightness and contrast are reduced for power saving at steps S25 and S69. Alternatively, power supply to the electronic book 1 may be controlled for power saving. For example, the electronic book 1 may be provided with a power control section for managing the control of power supply to the electronic book 1. At the aforementioned steps S25 and S69, the display control section 5 may store, in a storage medium such as a volatile memory, hard disk or the like which is not shown, information about a displayed content, e.g., a current page number of the displayed content. Then, the power control section may halt the power supply to the screen 6, thereby shifting to the power saving mode. Thereafter, the power control section resumes the power supply to the screen 6 in response to a predetermined operation performed by the user (i.e., canceling of the power saving mode). At the same time, based on the aforementioned information about the displayed content, the display control section 5 displays on the screen 6 the content which has been displayed immediately before shifting to the power saving mode. By performing such a control as above, the power supply to the screen 6 is halted when the user is dozing and not reading a content, whereby power saving for the electronic book is achieved. Further, storing the information about the content, which has been displayed immediately prior to the shift to the power saving mode, allows the display to be quickly resumed.

Further, the power control section may perform a control to turn off the entire electronic book 1 as power saving at the above steps S25 and S69. When the power supply to the screen 6 is halted in the above-described manner, the power supply to the aforementioned volatile memory or the like still continues. Therefore, by turning off the entire electronic book 1, the power saving for the electronic book 1 is more improved compared to the above manner. In this case, however, the electronic book 1 is required to be reactivated. As a result, unlike the above manner, a display based on the information, which information is about the content having been displayed immediately prior to the shift to the power saving mode, cannot be provided.

Still further, the physiological condition of the user may be inferred by using both the nictitation information and pupil information. This allows the physiological condition of the user to be inferred more precisely.

Figure 12:
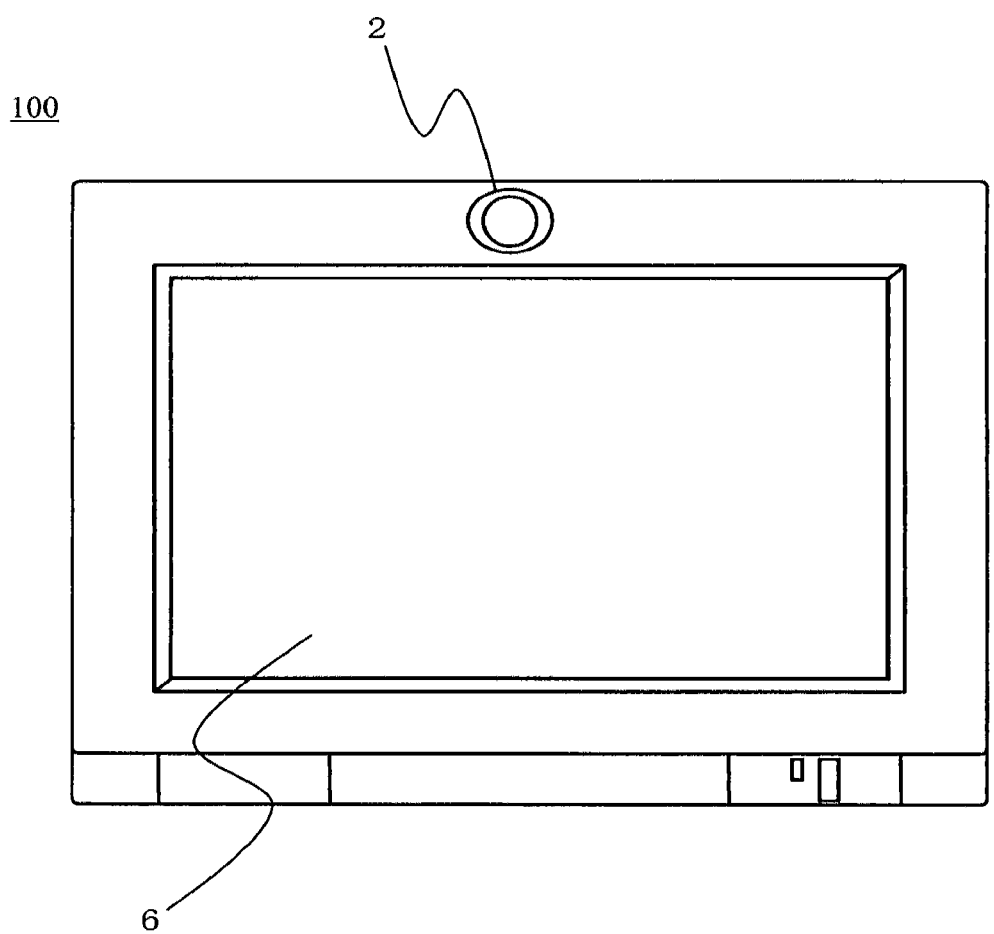
FIG. 12 is an external view of a television according to an embodiment of the present invention.

Not only the above-described electronic book 1 but also a television, a monitor of a personal computer, a monitor of a car navigation apparatus, a mobile phone or the like may be provided with the video image obtaining section 2, analysis section 4 and display control section 5, whereby the analysis process and display control process may be performed. In such a case, the video image obtaining section 2 is preferred to be mounted near the screen 6. This is because the user generally looks at the screen 6 when viewing content or the like. Mounting a camera near the screen 6 allows a face image of the user to be easily taken. FIG. 12 is an external view of a television 100 on which a camera is mounted in such a manner. In FIG. 12, the video image obtaining section 2 (camera) is mounted above the screen 6. However, a position in which the video image obtaining section 2 is mounted is not limited thereto. The video image obtaining section 2 may be mounted below the screen 6, or to a left or right side of the screen 6. Further, a plurality of such cameras may be mounted. Such a television 100 takes face images of the user by using the video image obtaining section 2, and performs the above-described analysis of the physiological condition. The television 100 then performs the above-described display control process in accordance with a result of the analysis, thereby adjusting the brightness and contrast of the screen 6.

Figure 13:
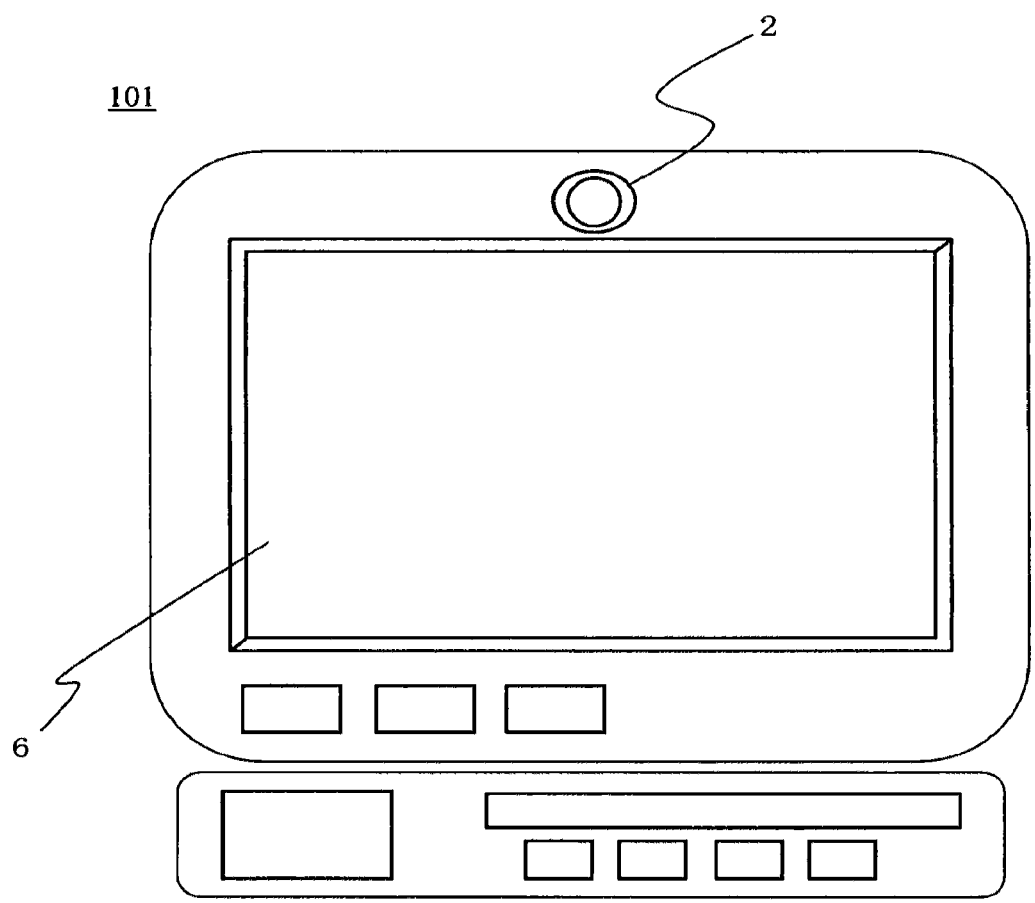
FIG. 13 is an external view of a car navigation apparatus according to an embodiment of the present invention.
Figure 14:
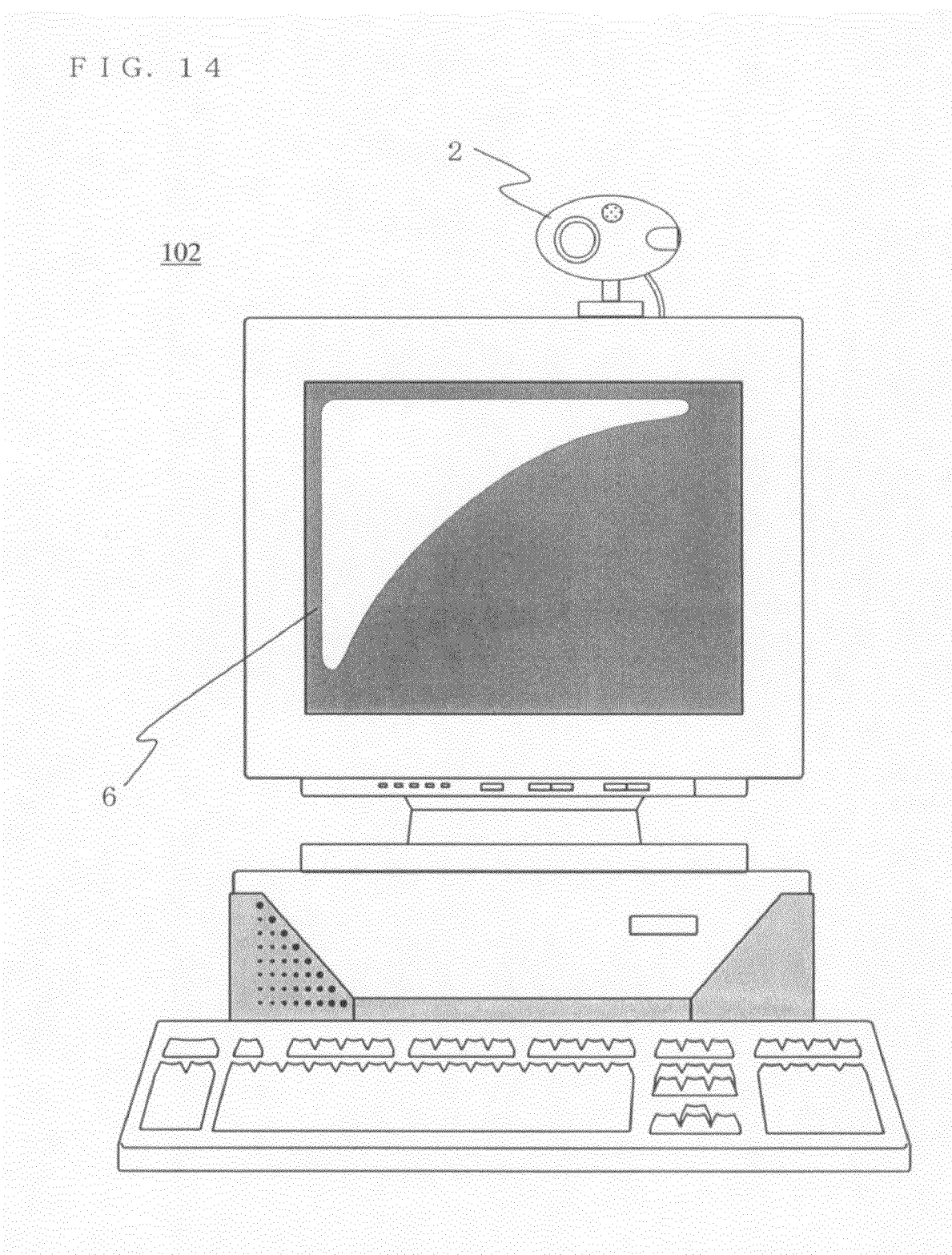
FIG. 14 is an external view of a personal computer according to an embodiment of the present invention.
Figure 15:
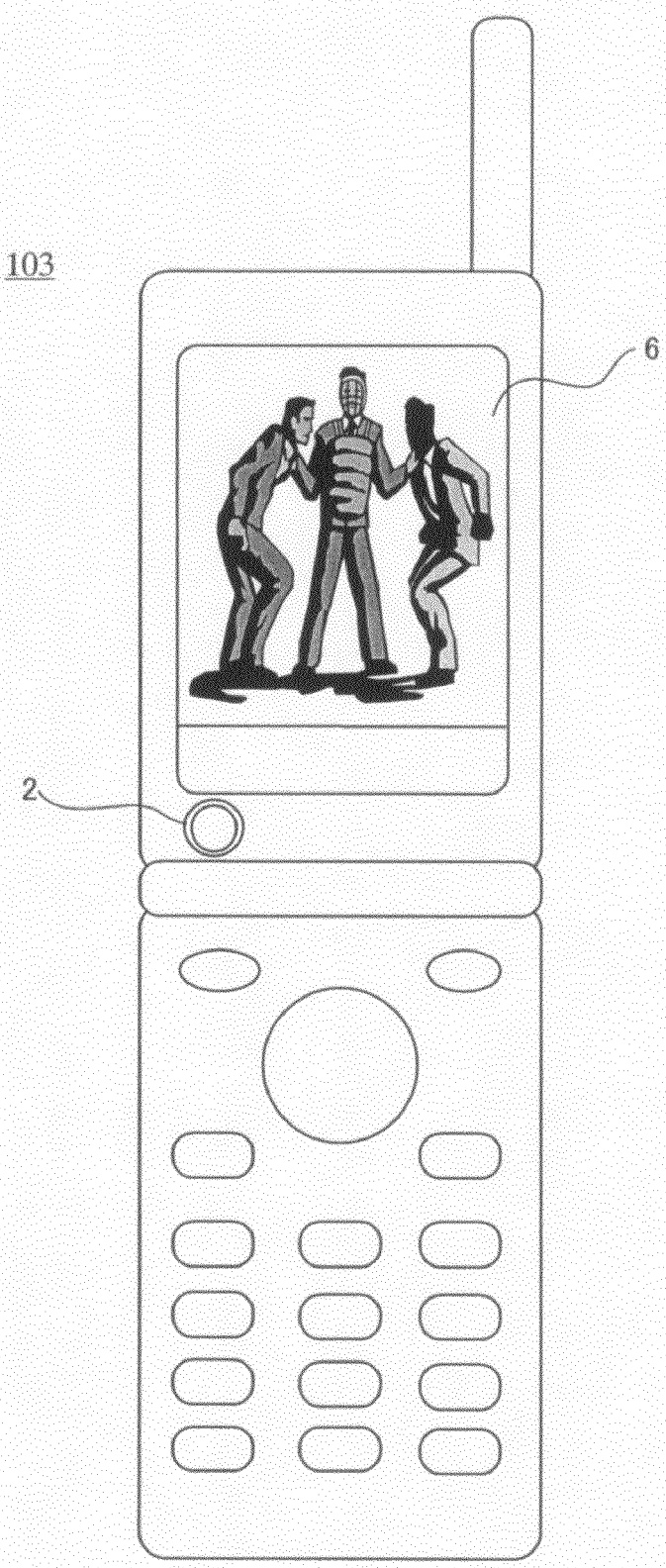
FIG. 15 is an external view of a mobile phone according to an embodiment of the present invention.

FIG. 13 is an external view of a car navigation apparatus 101 having the video image obtaining section 2 mounted thereon (hereinafter, referred to as a car navigation). FIG. 14 is an external view of a personal computer 102 having the video image obtaining section 2 mounted thereon. FIG. 15 is an external view of a mobile phone 103 having the video image obtaining section 2 mounted thereon. Similarly to the television 100, any of the above takes face images by using the video image obtaining section 2, analyzes the physiological condition, and performs the display control process in the above-described manner for the screen 6 in accordance with a result of the analysis. Note that, the video image obtaining section 2 in FIG. 14 is mounted in a removable manner by using USB (Universal Serial Bus) or the like.

Although the analysis process is performed minute by minute in the above embodiments, the present invention is not limited thereto. The analysis process may be performed at a predetermined timing. For example, although the electronic book 1 always takes face images, the analysis process may start when a page flipping button of the electronic book 1 is pressed, or when a content switching operation is performed. Here, data to be analyzed may only be, e.g., video image data which is obtained during a time period from a time point, at which the page flipping button is pressed, to a time point at which 3 to 5 minutes have passed after the page flipping button is pressed. This is because of the following reasons. Generally speaking, when a person is engaged in a visual information processing task (e.g., television viewing, electronic book browsing, driving, continuous monitoring work and the like), frequency of nictitation is reduced so as to prevent loss of visual information. However, after the task is completed, a nictitation rate rises and the number of cluster nictitation occurrences increases as a rebound. For this reason, data is not analyzed when the user is continuously viewing a content, but obtained after, e.g., an input is provided through an operation button, i.e., after a timing at which the visual information processing task is completed, and then the aforementioned analysis process is performed. This improves efficiency in processing. In the case of the television 100, the television 100 is provided with, e.g., commercial detection means for detecting a switch in audio signal between stereo and monaural, thereby detecting a start of a commercial break during a program. Here, the analysis process may be performed for video image data which is obtained during a time period from a time point, at which the commercial break is detected, to a time point at which 1 to 3 minutes have passed after the detection of the commercial break. Then, the display control process may be performed based on an analysis result. This is because a time point, at which a main content (program or the like) switches to a commercial break, is considered to be a timing at which the visual information processing task is completed.

Further, in the case of the car navigation 101, the car navigation 101 is provided with, e.g., velocity detection means for detecting a velocity of a vehicle by means of a velocity sensor. Here, the analysis process may be performed when the velocity is 0, i.e., at a timing when the vehicle stops. This is because a driver is considered to be basically looking at a traveling direction while driving, and look at the car navigation only when the vehicle is stationary, e.g., when the vehicle stops at a red light. In other words, a timing when the vehicle stops is considered to be a timing when the visual information processing task is completed, and therefore, the analysis process is performed at such a timing. Further, the analysis process may be performed when the velocity of the vehicle is at a predetermined level or lower for a particular period of time, e.g., when the vehicle is caught in a traffic jam, because the driver tends to become tired when caught in a traffic jam even if the driver is not engaged in a visual information processing task.

Further, in the case of using, e.g., CAD software with the personal computer 102, the analysis process may be performed at a timing when a user has switched a diagram (diagram data), on which the user performs operations, to another diagram, because this timing is considered to be a timing when the visual information processing task is completed.

The video image obtaining section 2 may not necessarily always take face images. The video image obtaining section 2 may take face images at a timing of performing the analysis process. This reduces processing loads as well as power consumption.

INDUSTRIAL APPLICABILITY

The electronic display medium according to the present invention is capable of performing display control in accordance with a physiological condition of a human, and useful as an electronic display medium particularly for the elderly.

The invention claimed is:
1. An electronic display medium comprising:
a screen for displaying content;
a video image obtaining section for taking a face image of a user;
an analysis section for obtaining, as physiological information about a human, eye information about activities or changes in an eyeball and a peripheral body part of the eyeball, from the face image taken by the video image obtaining section, and for analyzing the eye information, thereby inferring that a physiological condition of the user is in a drowsy state when a number of nictitations is larger than a normal average number of nictitations and cluster nictitation occurs more than once within one or two seconds or when a pupil diameter of the user is 3 mm or smaller and a reaction speed of a pupil is a predetermined value or larger, or inferring that the physiological condition of the user is in a tired state when a period of time from when a closed eyelid starts opening to when an eyelid has completely opened is longer than a predetermined period of time or when the pupil diameter is 3 mm or smaller and the reaction speed of the pupil is a predetermined value or smaller; and
a display control section for controlling, in accordance with the physiological condition inferred by the analysis section, a display state of the screen displaying the content, wherein
the analysis section starts obtaining the physiological information after a visual information processing task is completed, and finishes obtaining the physiological information when a predetermined period of time has passed after starting obtaining the physiological information, and
when the analysis section analyzes the eye information and determines that the physiological condition of the user is in the tired state, the display control section increases, for the screen displaying the content, at least one of: contrast; brightness; and coloring, so as to increase the arousal level of the user, and when the analysis section determines that the physiological condition of the user is in the drowsy state, the display control section reduces, for the screen displaying the content, at least one of: contrast; brightness; and coloring.

2. The electronic display medium according to claim 1, further comprising an operation button for switching the content, wherein
the analysis section starts obtaining the physiological information by setting a time point, at which an input is provided through the operation button, to be a time point at which the visual information processing task is completed.

3. The electronic display medium according to claim 1, wherein
the screen selectively displays, as the content, a program and a commercial,
the electronic display medium further comprises commercial detection means for detecting a switch in the content from the program to the commercial, and
the analysis section starts obtaining the physiological information by setting a time point, at which the content switches from the program to the commercial, to be a time point at which the visual information processing task is completed.

4. A screen display control method used for an electronic display medium, the screen display control method comprising:
a video image obtaining step of taking a face image of a user;
an analyzing step of obtaining, as physiological information about a human, eye information about activities or changes in an eyeball and a peripheral body part of the eyeball, from the face image taken at the video image obtaining step, and analyzing the eye information, thereby inferring that a physiological condition of the user is in a drowsy state when a number of nictitations is larger than a normal average number of nictitations and cluster nictitation occurs more than once within one or two seconds or when a pupil diameter of the user is 3 mm or smaller and a reaction speed of a pupil is a predetermined value or larger, or inferring that the physiological condition of the user is in a tired state when a period of time from when a closed eyelid starts opening to when an eyelid has completely opened is longer than a predetermined period of time or when the pupil diameter is 3 mm or smaller and the reaction speed of the pupil is a predetermined value or smaller; and
a display control step of controlling, in accordance with the physiological condition inferred at the analyzing step, a display state of a screen displaying content, wherein
the analyzing step starts obtaining the physiological information after a visual information processing task is completed, and finishes obtaining the physiological information when a predetermined period of time has passed after starting obtaining the physiological information, and
when the analyzing step analyzes the eye information and determines that the physiological condition of the user is in the tired state, the display control step increases, for the screen displaying the content, at least one of: contrast; brightness; and coloring, so as to increase the arousal level of the user, and when the analyzing step determines that the physiological condition of the user is in the drowsy state, the display control step reduces, for the screen displaying the content, at least one of: contrast; brightness; and coloring.

* * * * *